(12) United States Patent
Locher et al.

(10) Patent No.: US 6,824,851 B1
(45) Date of Patent: Nov. 30, 2004

(54) PANELS UTILIZING A PRECURED REINFORCED CORE AND METHOD OF MANUFACTURING THE SAME

(75) Inventors: David M. Locher, Waukesha, WI (US); John J. Tommet, South Milwaukee, WI (US)

(73) Assignee: Milwaukee Composites, Inc., Oak Creek, WI (US)

( * ) Notice: Subject to any disclaimer, the term of this patent is extended or adjusted under 35 U.S.C. 154(b) by 0 days.

(21) Appl. No.: 10/110,094

(22) PCT Filed: Oct. 6, 2000

(86) PCT No.: PCT/US00/27673
§ 371 (c)(1),
(2), (4) Date: Apr. 5, 2002

(87) PCT Pub. No.: WO01/26899
PCT Pub. Date: Apr. 19, 2001

Related U.S. Application Data
(60) Provisional application No. 60/188,854, filed on Mar. 13, 2000, and provisional application No. 60/158,621, filed on Oct. 8, 1999.

(51) Int. Cl.[7] .......................... B32B 31/18; B32B 1/06; B32B 3/12; B32B 3/02
(52) U.S. Cl. ........................ 428/76; 428/68; 428/71; 428/72; 428/73; 428/116; 428/117; 428/118; 428/45; 428/60; 428/192; 156/79; 156/306.9; 156/307.7; 156/250; 52/783.1; 52/793.1
(58) Field of Search ............................. 428/76, 68, 71, 428/72, 73, 116, 117, 118, 45, 60, 192; 156/250, 79, 306.9, 307.7; 52/783.1, 793.1

(56) References Cited
U.S. PATENT DOCUMENTS

| | | | |
|---|---|---|---|
| 3,662,805 A | * | 5/1972 | Sygnator .................. 411/103 |
| 3,868,297 A | * | 2/1975 | Jamison et al. ............ 428/593 |
| 4,042,746 A | * | 8/1977 | Hofer ....................... 428/308.4 |
| 4,093,491 A | * | 6/1978 | Whelpton et al. ........... 156/66 |
| 4,361,613 A | * | 11/1982 | Bogner et al. .............. 428/119 |
| 5,240,543 A | * | 8/1993 | Fetterhoff et al. .......... 156/293 |
| 5,462,623 A | * | 10/1995 | Day ........................... 156/250 |
| 5,624,728 A | * | 4/1997 | Hoopingarner et al. ...... 428/76 |
| 5,798,160 A | * | 8/1998 | Kohn ......................... 428/56 |
| 5,834,082 A | | 11/1998 | Day |

FOREIGN PATENT DOCUMENTS

JP  3-61011154 A  *  1/1986

* cited by examiner

*Primary Examiner*—William P. Watkins, III
(74) *Attorney, Agent, or Firm*—Michael Best & Friedrich LLP

(57) ABSTRACT

A mass transit flooring assembly including a plurality of sandwich panels. The sandwich panels (30) include a top skin (54), a bottom skin (58), a perimeter defining closeout (46), and a core (50) between the top (54) and bottom skin (58) and within the closeout parameter (46). The closeout (46) includes mating surfaces used to connect adjacent panels. The core is a precured reinforced core including a plurality of phenolic ribs and foam strips positioned in an alternating fashion. The precured core is manufactured by impregnating a layer of fabric with phenolic resin between two foam cores and stacking in a similar alternating fashion to create a bun. After the bun is cured at a constant pressure and temperature and cooled, the bun is cut along a plane perpendicular to the plane of the layers to provide a precured reinforced core panel ready to be inserted as a core in a sandwich panel.

51 Claims, 5 Drawing Sheets

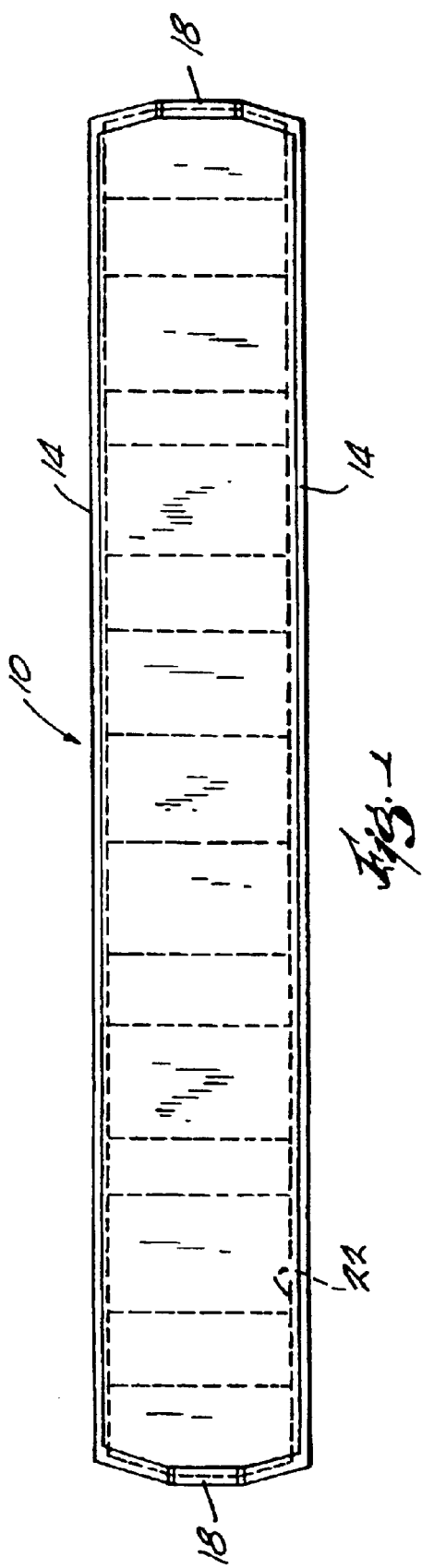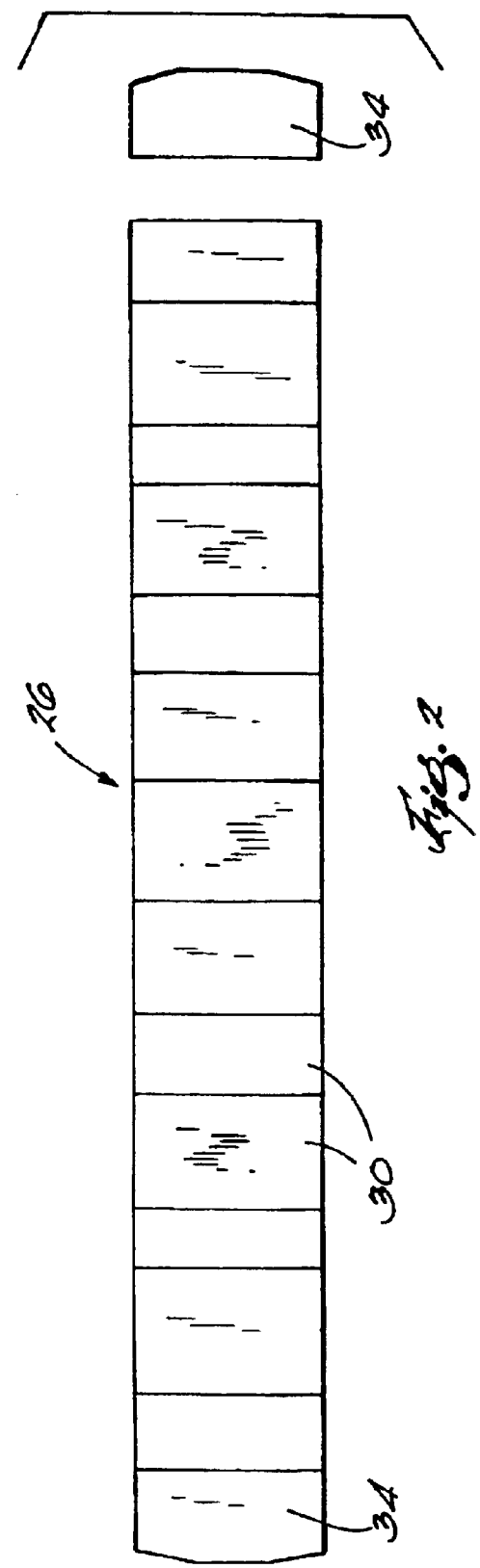

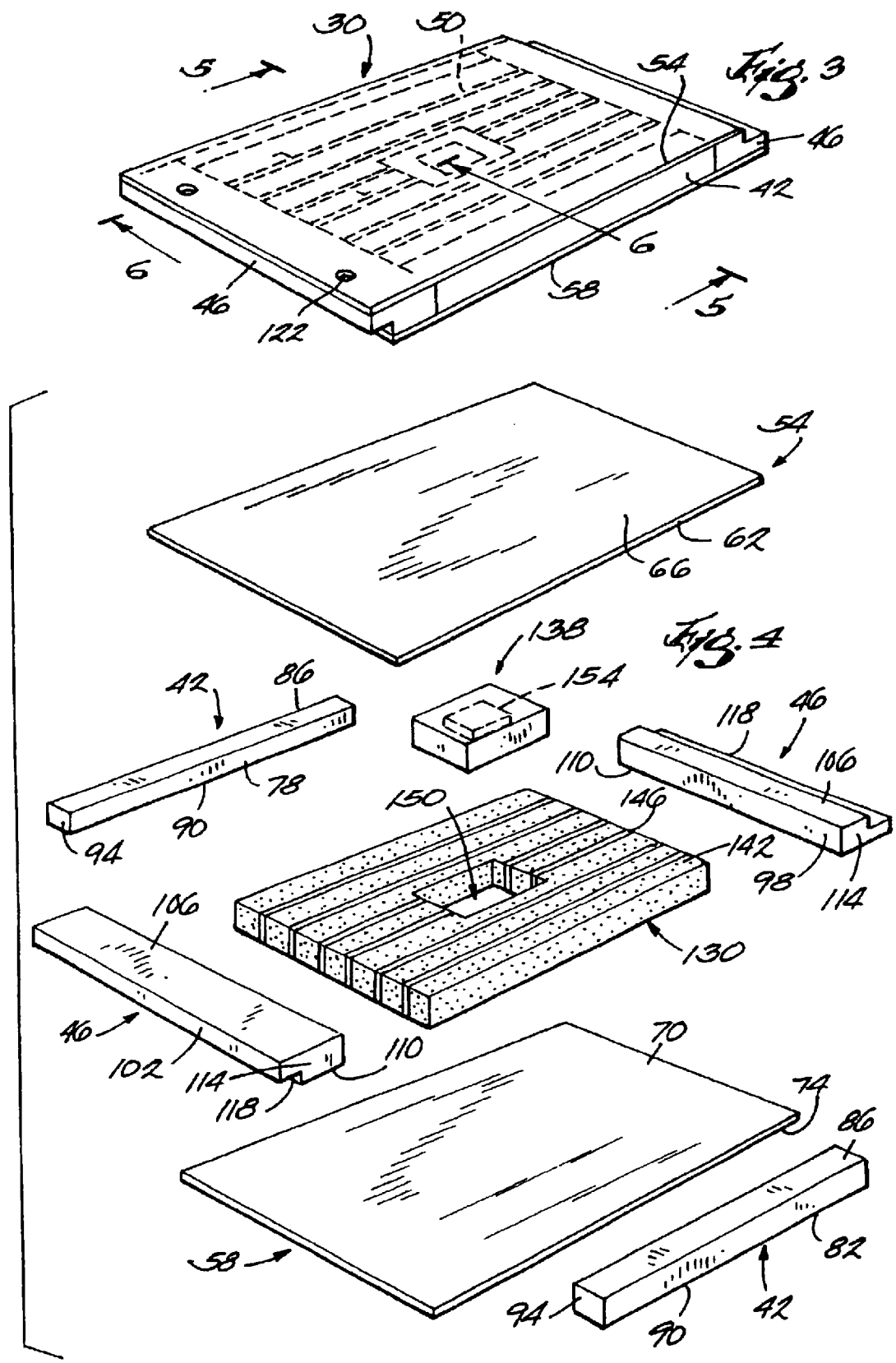

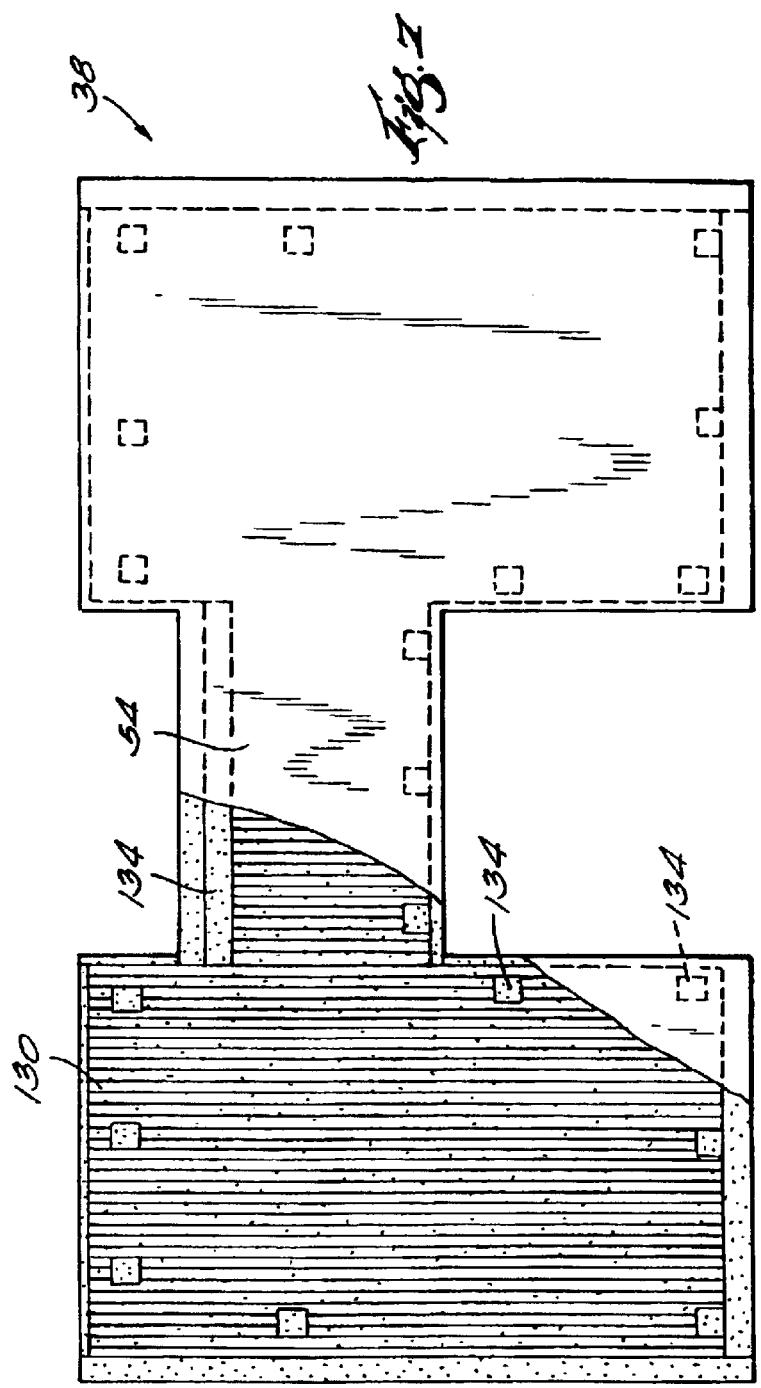
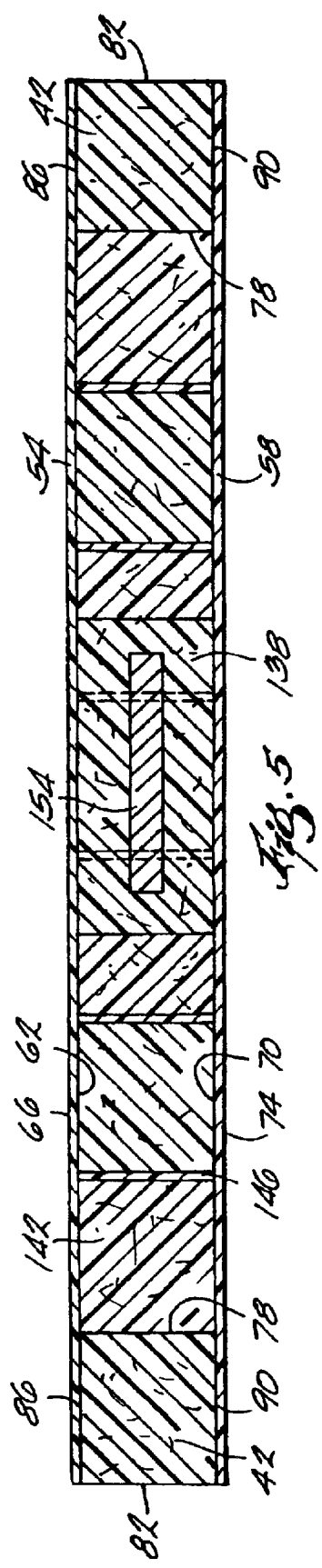

PANELS UTILIZING A PRECURED REINFORCED CORE AND METHOD OF MANUFACTURING THE SAME

This Application is a §371 of International Application No. PCT/US00/27673, which claims priority to U.S. Provisional Application No. 60/158,621, filed Oct. 8, 1999, and U.S. Provisional Application No. 60/188,854, filed Mar. 13, 2000.

BACKGROUND OF THE INVENTION

1. Technical Field

The invention relates to sandwich panels and, particularly, to sandwich panels utilizing precured reinforced cores and a method of manufacturing the same.

Sandwich panels are used in a wide variety of applications requiring structural and/or thermal insulation properties. These applications include structural and non-structural uses in rapid transit vehicles, refrigerated and non-refrigerated buildings, boats, aircraft, recreational vehicles, enclosed trailers and many others. Structural sandwich panels are composite structures formed by bonding two generally thin facings or skins to a relatively thick core material. The skins, which are normally dense and strong, resist compression and tension, while the core, which is normally made of relatively weak and low-density material, serves to separate the skins, stabilize them against buckling and resist shear loads.

2. Related Prior Art

Flooring assemblies used for mass transit vehicles are an example of a simple type of sandwich panel. Common materials used for the construction of flooring panels are varieties of wood and stainless steel. It is generally known to construct such flooring assemblies by providing thin sheets of stainless steel, which are affixed over the top of a support frame made of wood, usually balsa or plywood. The steel sheet provides an exposed surface having toughness and durability, while the wood frame provides the flooring with a lightweight, rigid supporting structure. This combination of components and material has become well-known in the industry as being desirable because certain constructions have the capacity to exceed safety requirements, including flame and smoke tests, which are required for all flooring assemblies used in mass transit applications.

Common cores for more standard sandwich panels are rigid expanded plastic foams and honeycomb materials. Honeycomb core usually comprises a thin sheet material, such as paper or aluminum foil, which is formed into a variety of cellular configurations. Expanded plastic foam cores usually provide much higher levels of thermal insulation than honeycomb, but honeycomb cores are normally substantially stronger than insulating foam cores of comparable density.

Various methods of introducing insulating foams into the cells of honeycomb have been used for the purpose of filling the voids or adding higher levels of thermal insulation to structurally adequate honeycomb core. These include such approaches as applying foaming chemicals to the honeycomb cells, and pressing slabs of plastic foam into the cells. However, these processes are difficult to perform in thick core sections, limit the types of foams that can be used to fill the cells of the honeycomb uniformly, or require large capital investment in machinery. As a result, such composite cores have enjoyed little use in most sandwich panel applications, and many honeycomb core products are consequently deficient in insulation and subject to migration of water into the core.

Sandwich panels with skins of metal, wood, fiberglass reinforced plastics and similar durable materials are widely manufactured by three basic processes. In one process, liquid chemicals, commonly of polyisocyanurate formulation, are injected between the skins, after which they react and expand to form a rigid foam that bonds itself to the skins to form the sandwich panel. A second method of producing sandwich panels is by adhesive lamination wherein preformed panel skins are bonded by adhesive to cores of rigid foam boards or slabs that have been cut from expanded foam billets. In the third method, uncured resins and reinforcing materials are applied to the surfaces of such foam boards, or resins are introduced into closed or vacuum bagged molds containing the core and skin reinforcements and subsequently cured to form rigid skins. The curable resins may be, for example, thermosetting polyester, vinylester, epoxy, polyurethane or phenolic. Thermoplastic resins, such as polypropylene or polyetheretherketone (PEEK) may also be used, with the application of sufficient heat to cause them to flow and wet out the reinforcements. Reinforcements include such materials as glass, carbon or synthetic polymer fibers woven or stitched into fabrics or formed into dense mats of random fibers that are laid down in generally planar alignment.

Sandwich panel laminators use a wide variety of these preformed cores, including polyurethane, polyisocyanurate, extruded polystyrene, expanded polystyrene, polyvinylchloride and foam glass. Plastic foam cores for structurally demanding sandwich panel applications, such as the hulls of boats, are commonly made of linear or cross-linked polyvinyl chloride (PVC) formulations, in densities of from 2 to 16 pounds per cubic foot. The high cost of these materials per board foot has limited their use in such major median to high performance applications as highway trailers and recreational vehicles. A further drawback of the PVC foams and of other thermoplastic foams, such as polystyrene, is serious degradation of their physical properties at elevated temperatures encountered in transportation and other environments.

Plastic foam core sandwich panels often involve serious compromises in their design and cost due to inherent structural limitations of the rigid foam insulation cores. In addition to the deflection of these panels due to compressive and tensile stresses in the skins, further deflection results from the relatively low shear modulus of the rigid foam material. The thicker the core, the more important shear deflection becomes, to the point of exceeding deflection due to bending. Under a sustained load, the plastic foam core is also subject to creep deformation, further increasing panel deflection, with resulting risk of failure of the sandwich panel.

These deficiencies of the core may require increasing the strength and stiffness of the composite through the use of excessively heavy and expensive skins. Alternately, the panel could be improved structurally by increasing the thickness or density of the foam core beyond acceptable limits, which also raises the costs of both material and shipping. The relatively low compressive modulus of low density plastic foam cores also allows buckling of thin flat panel skins to occur at relatively low stress levels, again calling for overdesign of skins or higher density foam cores as a compensation. Low shear resistance and the absence of reinforcing elements within the foam core also permit the propagation under stress of cracks or fissures between the core and the panel skins as well as within or through the core itself, with resulting deterioration or structural failure of the panel. Still another difficulty is the low compressive strength of most plastic foams, which allows concentrated or impact loads to distort both skins and core.

Reinforcing frames or ribs of metal, wood, fiberglass reinforced plastic and other materials have been used in foam core sandwich panels to mitigate or overcome the structural limitations described above. Although both foam core and ribs contribute to the strength of these panels, the structural contribution of the ribs in such constructions is not fundamentally dependent upon the presence of the foam core.

An often serious drawback of widely spaced ribs is the creation of overly rigid sections of the structure within a generally more flexible panel. This can result in undesirable concentrated loads at the intersection of ribs and face laminates, especially with thinner face laminates made with higher strength composite materials. Structural properties of the composite may be improved by assembling between the skins a large number of individual blocks or strips of foam wrapped with fibrous reinforcing materials that connect the skins and fill the space between them. Impregnating resins are applied to both skin and core reinforcements during this layup process. Alternately, all components of skin and core reinforcement and foam may be positioned in a mold while in a dry and porous state, after which the mold is closed and resin is introduced under pressure, as in vacuum-assisted resin transfer molding, to flow into and impregnate the reinforcements.

Another common method of manufacturing a reinforced foam core utilizes adhering dry absorptive fibrous webs to alternating foam core panels. The reinforced foam core is provided by stacking rigid foam insulation boards and thin flexible fibrous sheets in alternating layers with adhesive between the layers, and then compressing the stack while the adhesive cures to form a core panel or billet. The billet is cut through the alternate layers and along parallel spaced planes to form reinforced foam core panels each having spaced webs formed by strips of the fibrous sheets. The method of using a reinforced foam core with the dry fibrous webs has become well-known in the industry as being desirable because the porosity in the dry webs allows for forming integral bonds by absorbing resin applied to the overlying panel skins.

SUMMARY OF THE INVENTION

Among the difficulties presented by known flooring assemblies are difficulty in the manufacture, assembly and installation of the flooring assemblies. The wood and steel flooring must be both manufactured and installed within the vehicle itself. The process does not allow for a cost saving prefabrication of floor sections.

Another difficulty presented by known flooring assemblies is the relatively high maintenance costs associated with such flooring. In this regard, known flooring assemblies are difficult to seal against moisture penetration. In the environment of mass transit vehicles, such as passenger trains, busses, and the like, moisture in the form of water and is often carried onto the flooring, and can seep into the flooring and into contact with the wood frame. Once the moisture is allowed to saturate the wood frame, the moisture is captured underneath the steel sheeting. This leads to an accelerated decomposition or rotting process. The rotted frame leaves the flooring susceptible to damage, which necessitates replacement of the rotted wood or replacement of the entire floor.

The present invention addresses these problems by providing a rugged, lightweight, water resistant composite flooring that is capable of simple manufacture and installation. This design uses proven materials and components, and features the superior flame and smoke performance ratings of phenolic composite materials. This design also offers a weight reduction compared to the traditional transit car floors.

In one embodiment, the invention provides a flooring assembly which is constructed of composite materials that are sufficiently rigid and water resistant so as to meet the rigors of the mass transit environment. In addition, the components of the flooring assemble are made of a composite material that pass the requisite safety testing.

In particular, the invention provides, among other things, a composite floor containing phenolic components. The flooring assembly includes a composite panel having a sandwich construction. The panel is made by bonding two thin skins, or facings to a relatively thick core material. The skins are made from a structural phenolic composite. The skins are cured after impregnating two fiberglass reinforcement sheets with phenolic resin. The core material includes a combination of lightweight and rigid closed-cell foam and phenolic ribs. The phenolic ribs provide the necessary reinforcement in the floor. The foam core resists moisture absorption and also provides superior bonding characteristics to the skins. Further advantages of the precured ribbed core and disadvantages of other core materials are further discussed below.

Phenolic closeout is molded into the edges of the floor panel to prevent moisture from entering the core and to provide extra strength and stability to the floor panel. The phenolic closeout surrounds the perimeter of the floor panel and is bonded by the same curing process to the top and bottom skin to seal the core from moisture.

The phenolic floor assembly is easily installed into the mass transit vehicles. The floor is assembled on site from multiple pre-fabricated floor panels. The phenolic closeout is easily machined, allowing the creation of a high density joint between panels. The pre-fabricated floor panels can be easily connected to each other by lap joints cut into the phenolic closeout. Tapping plates and mounting blocks, made from closeout material, can be cured within the core of the panel to provide extra support in mounting areas. These areas of the panel can easily be drilled and tapped on site to mechanically fasten the floor panel to the vehicle frame.

In one embodiment, the invention provides a flooring assembly including a plurality of floor panels. Each of the panels are interconnected and each panel includes a top skin defining a top surface, a bottom skin defining a bottom surface. The assembly also includes closeout member contacting the top skin and the bottom skin and defining in part the perimeter of said floor panel. The flooring assembly also includes a core located between the top and bottom skins. The core includes a ribbed core having a side wall contacting the closeout member.

In another embodiment, the invention provides a flooring assembly for use in passenger trains, wherein the passenger train includes a car assembly including spaced apart side walls, spaced apart end walls, and a floor support assembly. The flooring assembly includes multiple floor panels interconnected to cover the floor support assembly, the floor panels each including a top skin having two side edges, two end edges, an inner face, and an exposed face defining the top surface of said floor panel. Each floor panel also includes a bottom skin having two side edges, two end edges, an inner face, and an exposed face defining the bottom surface of said floor panel. Each floor panel also includes two side closeouts, each of the side closeouts including an inner face, an outer face exposed on the side of the floor panel, a top face contacting the inner face of the top skin, a bottom face contacting the inner face of the bottom skin, and two end faces defining the length of the side closeout. Each floor panel also includes two end closeouts including an inner face contacting the end faces of the side closeouts and defining with the side closeouts the outer perimeter of said floor panel. The flooring assembly also includes a core located within the side closeouts and end closeouts, the core includes side walls contacting the inner walls of the side closeouts and end closeouts. The core also includes a top surface contacting the inner face of the top skin, and a bottom surface contacting the inner face of the bottom skin.

Common core materials used in sandwich panels present many disadvantages. Among the difficulties presented by the reinforced foam cores with the dry webs is that the adhesives used to bond the dry webs to the foam cores prevent its use in industries with stringent safety standards. For example, the mass transit industry is regulated by numerous safety requirements, including flame and smoke tests for all flooring assemblies used in mass transit applications. The urethane adhesive, which is most commonly used for bonding, produces a gas when burned that does not meet the standards set forth by the regulations. Therefore, this type of reinforced core is unavailable for panels used within the mass transit industry.

Visual inspection of the quality of the phenolic bond in the ribs absent a destructive test can also be difficult or impossible. The dry webs become partially saturated from the liquid phenolic resin used to impregnate the glass fabric for the top and bottom skin. Because the web is cured at the same time as the top and bottom skin the integrity and extent of the curing that has taken place within the web is visually inaccessible. To determine the quality of the web cure, the web must in some way be made visually accessible. For example, the panel could be cut into a cross section.

Other difficulties presented by the adhered dry web foam core are inconsistent and non-uniform phenolic bonding due to the presence of adhesive and voids within the web. Ideally, the dry web material should be completely impregnated with the liquid phenolic resin to yield a consistent and uniform phenolic bond after curing. However, the urethane adhesive impregnates the dry material initially, which, in turn, does not allow for the proper impregnation of the phenolic resin. As a result, the urethane areas provide a weaker bond than the phenolic areas. Also, the adhesive is applied from a drip bar that drops adhesive at intermediate locations on the fabric surface. Because the adhesive is not evenly and completely applied to the web, air pockets and voids may occur during the resin impregnating stage. These voids in the web add to the uncertainty of the web characteristics. A fully phenolic bond produces a more structurally rigid and sound piece, which leads to consistent performance and reliability.

Another difficulty presented by the reinforced foam cores with the dry webs is the difficulty in handling because of the tenuous bond between the foam core and the dry web. The reinforced foam cores are used in the manufacturing of the phenolic panels and are therefore frequently handled and moved. This movement can often times result in broken bonds between the dry web and the foam core. This leads to either waste or extra cost to implement systems that will minimize breakage.

The present invention addresses these problems by providing a method of manufacturing a precured reinforced foam core that is capable of exceeding the mass transit industry's safety standards and is capable of providing a visually accessible, stronger, and more uniform phenolic bond throughout the entire rib.

In particular, the precured reinforced core surpasses the safety tests required by the mass transit industry. The foam panels and glass fabric are bonded together using the liquid phenolic resin. The cured phenolic, along with the other materials making up the core, pass the requisite safety testing. Adhesives, which fail to meet the flame and smoke test safety standards, are not utilized.

Additionally, the quality of the phenolic bond is visually accessible before the core is hidden within the skins of the panel. After the bun is cured at a constant temperature and pressure, the bun is cut in a plane perpendicular to the plane of the foam sheets. The core strips will have two edges that will expose both the ribs and the foam. From this vantage point, the quality of the phenolic bond can be assessed visually. Also, the glass fabric does not contain any adhesives that prevent uniform saturation of the liquid phenolic resin. Because the quality of the phenolic bonds can be verified visually and uniform impregnation of the liquid phenolic resin can be achieved, the overall performance and quality of the floor panel will remain consistent.

Other features and advantages of the invention will become apparent to those skilled in the art upon review of the following detailed description, claims and drawings.

DESCRIPTION OF THE DRAWINGS

FIG. 1 is a plan view of a car assembly which is a first embodiment of the invention.

FIG. 2 is an elevation view of a portion of the assembly shown in FIG. 1.

FIG. 3 is a perspective view of the floor panel included in the floor assembly shown in FIG. 2.

FIG. 4 is an exploded perspective view of the floor panel shown in FIG. 3.

FIG. 5 is a cross-sectional view taken along line 5—5 in FIG. 3.

FIG. 7 is a plan view of a second car floor assembly which is an alternative embodiment of the invention.

FIG. 8 is a flow chart depicting a method of manufacturing precured reinforced core embodying the invention.

Figure 9:
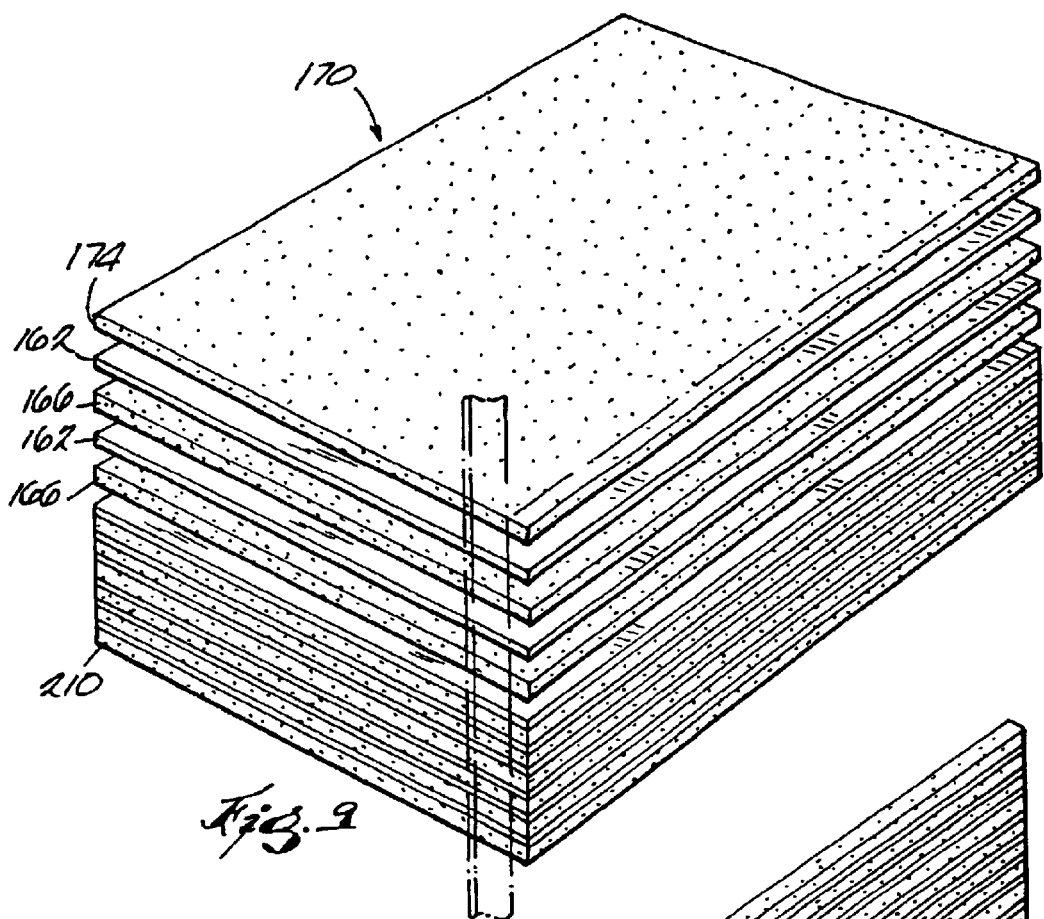
FIG. 9 is an exploded perspective view of a bun of precured reinforced core manufactured in accordance with the flow chart in FIG. 8.
Figure 10:
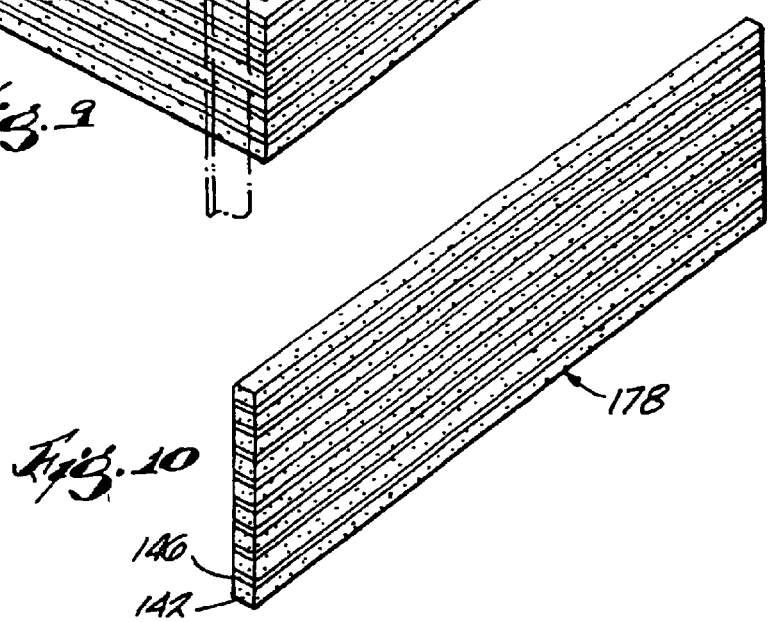
FIG. 10 is a perspective view of a panel of precured reinforced core cut from the bun shown in FIG. 9.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

FIGS. 1–6 illustrate a first car assembly 10 embodying the invention. With reference to FIG. 1, the car assembly 10 is a passenger train car which includes spaced apart side walls 14 and spaced apart end walls 18. The two opposite side walls 14 are connected with the two opposite end walls 18 which together define the perimeter of the assembly 10. The car assembly 10 also includes a floor support assembly 22 (shown in phantom in FIG. 1). The floor support assembly 22 extends about the perimeter of the car assembly 10, with members spaced in intervals perpendicular to the length.

The car assembly 10 also includes (FIGS. 1 and 2) a floor assembly 26 secured to the floor support and encompassed by the side walls 14 and the end walls 18.

In reference to FIG. 2, the floor assembly 26 includes multiple floor panels 30 and two end panels 34. The floor assembly 26 provides support for passengers, seating, and the like within the transit car 10. The floor panels 30 and end panels 34 are interconnected to cover the entire area within the car 10.

The floor assembly 26, including the panels 30 and 34, can be configured in any number of ways to provide a mass transit vehicle floor. For example, FIG. 7 illustrates a second car flooring assembly 38 which is an alternate embodiment of the invention. The flooring assembly 38 is suitable for use as the floor in a driver compartment located within a passenger bus and above the bus frame. The floor panel 38 has a perimeter that differs dramatically from floor 26, but is constructed of the same basic components.

The floor panels 30, 34 are of similar construction. The individual shapes of each depend upon the position of the panel and the configuration of the side walls 14 and end walls 18 of the car assembly 10 which surrounds the floor assembly 26. Therefore, for the ease of understanding, only a single floor panel 30 shall be described in detail.

With reference to FIGS. 3 and 4, each floor panel 30 includes two side closeouts 42, and two end closeouts 46. The two end closeouts 46 are separated by a distance and connected to the ends of the side closeouts 42. The floor panel 30 also includes a core 50. The core 50 occupies the space defined by the connected pairs of closeouts 42, 46. The core material can be comprised of balsa, plywood, foam, reinforced materials, or any combination thereof. The floor panel 30 also includes a top skin 54 and a bottom skin 58. The top skin 54 is located above and the bottom skin 58 is located below the core 50, the end closeouts 46, and the side closeouts 42. The skins 54, 58 and closeouts 42, 46 act to prevent moisture from reaching the interior of the panel 30.

The top skin 54 provides a durable facing on the top surface of the floor panel 30. The top skin 54 provides an inner face 62 which contacts the top side of the core 50, the side closeouts 42, and the end closeouts 46. The top skin 54 also provides an exposed face 66 which defines the top surface of the floor panel 30.

The bottom skin 58 provides a durable facing on the lower side of the panel 34 for stability and mounting purposes. The bottom skin 58 also includes an inner face 70 and an exposed face 74. The inner face 70 contacts the bottom side of the core 50, the side closeouts 42, and the end closeouts 46. The exposed face 74 defines the bottom surface of the floor panel 30.

The side closeouts 42 each include an inner face 78 and an outer face 82. The inner face 78 of the side closeout 42 contacts the core 50 and the outer face 82 of the side closeout 42 is exposed on the side of the floor panel 30. The side closeout 42 also includes a top face 86 and a bottom face 90. The top face 86 of the side closeout 42 is in contact with the inner face 62 of the top skin 54 and the bottom face 90 of the side closeout 42 is in contact with the inner face 70 of the bottom skin 58. The side closeout 42 also includes two end faces 94 (one shown). The end faces 94 define the length of the side closeout 42.

The end closeouts 46 each also include an inner face 98 and an outer face 102. The inner face 98 of the end closeout 46 is in contact with the end faces 94 of the side closeouts 42 which, in combination, define the outer perimeter of the floor panel 30. In the area between the side closeouts 42, the inner face 98 of the end closeout 46 is in contact with the core 50. The outer face 102 of the end closeout 46 is exposed on the side of the floor panel 30. The end closeout 46 also includes a top face 106 and a bottom face 110. The top face 106 of the end closeout 46 contacts the inner face 62 of the top skin 54 and the bottom face 110 of the end closeout 46 is in contact with the inner face 70 of the bottom skin 58. The end closeout 46 also includes two end faces 114 (one shown). The end faces 114 of the end closeout 46 are exposed to the sides of the floor panel.

The end closeouts 46 also include a mating surface 118. The mating surface 118 allows for simple assembly of pre-fabricated floor panels 30 in the mass transit vehicle. Typically, this surface is a lap joint. The mating surfaces 118 contact another mating surface 118 of an adjacent floor panel 30.

Figure 6:
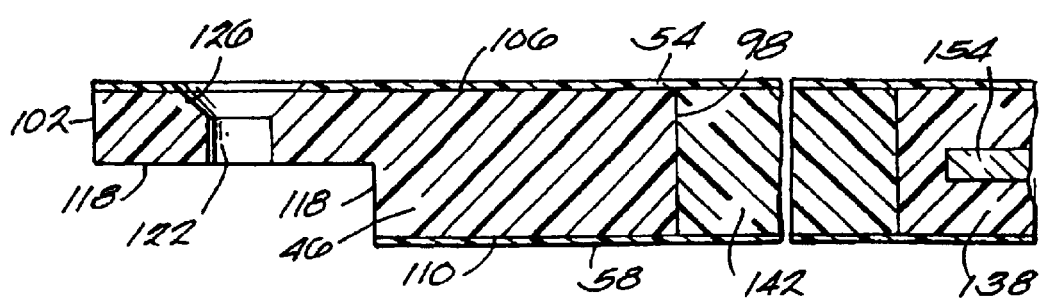
FIG. 6 is a cross-sectional view taken along line 6—6 in FIG. 3.
Figure 6:
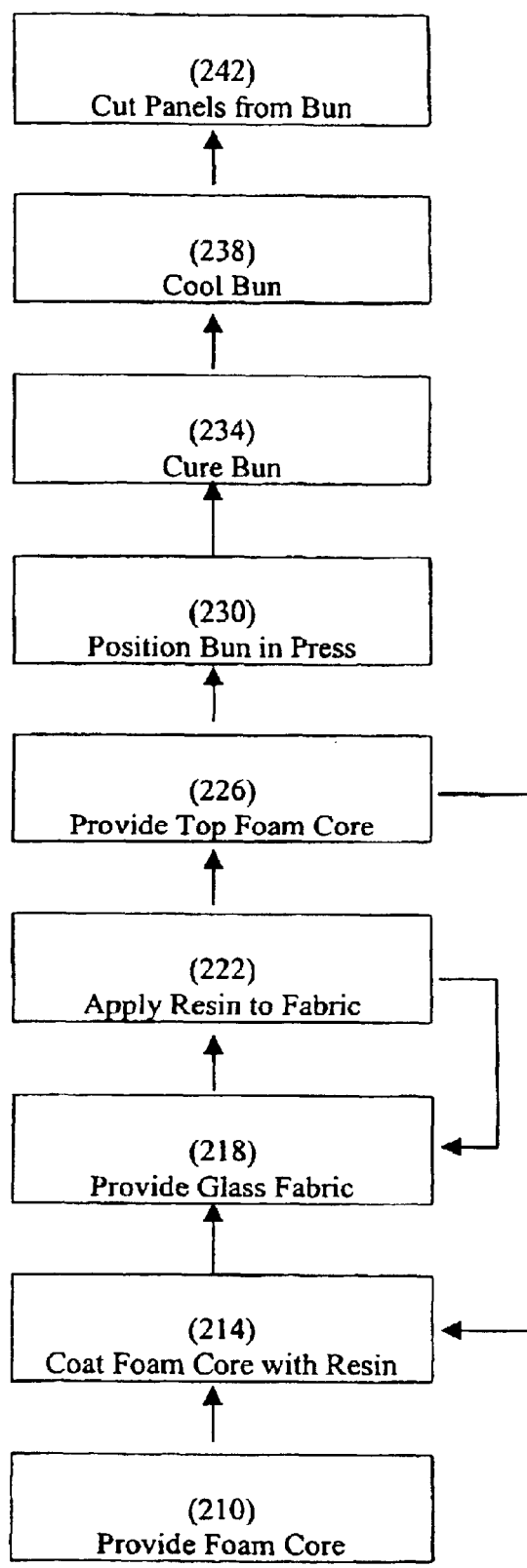

With reference to FIG. 6, the mating surface 118 includes bores 122, and countersinks 126. The bores and countersinks 122, 126 along the mating surface 118 allow for mechanically fastening adjacent floor panels 30, 34 together end to end and fastening the floor panels 30 to the floor support 22.

With reference to FIG. 4, the core 50 occupies the interior of the floor panel 30. The sides of the core 50 contact the inner faces 98, 78 of the end closeouts 46 and the side closeouts 42. The core 50 includes a top surface and a bottom surface. The top surface of the core 50 is in contact with the inner face 62 of the top skin 54 and the bottom surface of the core 50 is in contact with the inner face 70 of the bottom skin 58. The core 50 includes a precured reinforced core 130, a mounting block 134 (not shown), and a tapping block 138.

With reference to FIGS. 4, and 5, the precured reinforced core 130 provides support for the floor panel 30 and includes a plurality of foam strips 142 and a plurality of ribs 146. The ribs 146 and foam strips 142 are arranged in alternating layers. The precured reinforced core 130 and method of manufacturing the same will be discussed in further detail below.

More particularly, and with reference to FIG. 5, the ribs 146 within the precured reinforced core 130 include a top edge and a bottom edge. The top edge of the rib 146 is in contact with the inner face 62 of the top skin 54 and the bottom edge of the rib 146 is in contact with the inner face 70 of the bottom skin 58. The rib 146 also includes two exposed edges. The exposed edges of the rib are located on the layered end of the precured reinforced core 130 and, as shown in the preferred embodiment, contact the inner face 98 of the end closeout 46. The rib 146 also includes two mating faces. The mating faces of the rib are in contact with either two internal foam strips 142 or one internal foam strip 142 and one end foam strip 142.

Moreover, the foam strips 142 include a top face and a bottom face. The top face of the foam strips is in contact with the inner face 62 of the top skin 54 and the bottom face of the internal foam strip is in contact with the inner face 70 of the bottom skin 58. The internal foam strip 142 also includes two exposed ends. The exposed ends are located on the layered end of the precured reinforced core 130 and, as shown in the preferred embodiment, contact the inner face 98 of the end closeout 46. The foam strip 142 also includes two mating faces. The mating faces of the foam strips contact the mating faces of the adjacent ribs 146.

The precured reinforced core 130 also includes support cutouts 150. The support cutouts 150 allow space for other components, such as a mounting block 134 or tapping block 138, to be cured within the core 50. The support cutouts 150 are created by removing material from the precured reinforced core 130. The support cutouts 150 can be located anywhere within the precured reinforced core 130 and also can vary in size and shape.

The mounting block 134 includes a top face and a bottom face and is used to provide improved strength in concentrated areas of the floor assembly 26, e.g., for mounting objects such as seating fixtures, etc. to the flooring assembly 26. The top face of the mounting block 134 contacts the inner face 62 of the top skin 54 and the bottom face of the mounting block 134 contacts the inner face 70 of the bottom skin 58. The mounting block 134 fits inside the support cutout 150, is generally made of phenolic material, and is not confined to any specific two-dimensional geometric shape.

The tapping block 138 includes a top face and a bottom face and provides a means for providing concentrated strength in the floor assembly 10, e.g., for mechanical fasteners. The tapping block 138 also fits inside a support cutout 150 in the precured reinforced core 130. The tapping block 138 also includes a tapping plate 154. The tapping plate 154 is cured within the center of the tapping block 138. The tapping block 138 is also not confined to any specific two-dimensional geometric shape. The tapping plate 154 is preferably made of steel and provides the mechanical characteristics necessary to cut threads within the floor panel and to use threaded mechanical fasteners.

The structural phenolic composite skins are preferred because of superior flame and smoke performance. The skins are also preferably arranged in bi-axial orientations, i.e., at 0 and 90 degrees, to provide structural rigidity. The closeout material is a reinforced phenolic syntactic material which is machined into the required configuration after the panel is assembled.

The combination of a phenolic skins, ribs, closeout material and closed foam core material results in a lightweight, high-strength floor panel and floor assembly. The laminated structure does not afford the infiltration of moisture or other corrosive elements, and provides excellent bonding with the composite skins. A flooring assembly using the disclosed construction can have a weight of approximately 1.3 pounds per square foot and provides a excellent strength, acoustic, and thermal characteristics as well.

The method of manufacturing the precured reinforced core 130 embodying the invention is illustrated in the flow chart in FIG. 8. First, a generally rectangular board of rigid closed cell foam core 158 is provided to act as a base (210). The perimeter dimensions of this foam core base 158 should be sized for convenient workability and are limited by the size of the curing press and the curing oven. In one embodiment of the invention, the foam core base 158 is laid flat on a preparation table. The preparation table must be large enough to accommodate the size of the base 158. The surface of the table is provided with three vertical stops that are used to align consecutive layers in the same position as the base layer 158. The first vertical stop is provided on the shorter lateral edge of the table while the second and third stops are separated by a distance and located on the longer longitudinal edge of the table. Once the foam core base 158 is positioned on the table, the lateral edge is pushed against the first stop. While still maintaining contact with the first stop, the foam core base 158 is moved so that the longitudinal edge rests against the second and third stop. The preferred thickness of the foam core is 0.80" and the thickness preferably remains consistent throughout the stacking process. The core thickness can be varied for different floor panels and is dependent upon the required strength to weight characteristics.

Next, the foam core base 158 is coated with a thin layer of phenolic liquid resin (214). Foam core intermediates 166 are also coated with a thin layer of phenolic liquid resin as will be discussed later. The resin can be applied with brushes or by other common means. After promoting the core 158, a layer of bi-axially-oriented fiberglass fabric 162 is placed on top of the foam core 158 and liquid phenolic resin (218). In the preferred embodiment, the strands of the fiberglass fabric 162 should be offset at a 45-degree angle relative to the axis defined by the longitudinal and lateral edges of the foam core 158 to achieve optimum strength. In addition, the fiberglass fabric 162 should be cut to a size approximately equal to the surface of the foam core 158, and positioned to cover the surface of the foam core 158. Subsequently, another layer of liquid phenolic resin impregnates the fiberglass fabric 162 (222). This can be applied in a manner similar to that previously described. In other embodiments, multiple layers of fiberglass fabric 162 can be placed on the existing fiberglass fabric 162 layer. If more than one layer of fiberglass fabric 162 is introduced, the second sheet of fiberglass fabric 162 is positioned directly on top of the first fiberglass fabric 162 after the phenolic resin has been applied over the first. Once the second sheet of fiberglass fabric 162 covers the first 162, the second layer must be wet out with a coat of liquid phenolic resin in a similar fashion. In other words, steps (218) and (222) are repeated to obtain the desired thickness of fiberglass fabric 162.

Once the desired thickness has been achieved, a foam core intermediate 166 is placed on top of the fiberglass fabric 162 (226). The intermediate is then coated with a thin layer of liquid phenolic resin similar to the coating of the foam core base 158 in step (214). In the preferred embodiment, the three table stops are utilized as guides. As a result, the top face of the foam core base 158 and lower face of the foam core intermediate 166 sandwich the fiberglass fabric 162 impregnated with the liquid phenolic resin. A plurality of layers of fiberglass fabric 162 can then be placed on the foam core intermediate 166, impregnated with the liquid phenolic resin, and then covered by another foam core intermediate 166, in a manner consistent with steps (218), (222) and (226). In other words, multiple intermediate foam cores 166 may be utilized with multiple layers of impregnated fiberglass fabric 162 being placed in between the intermediate foam cores 166 as illustrated in FIG. 8.

Successive stacking in these different manners creates a bun 170. Once the bun 170 reaches the desired height, a foam core top 174 is positioned on top the bun 170 (226). This foam core top 8 is similar to the foam core intermediates 166 and the foam core base 158 except that it completes the stack and has a dry top surface. The desired bun thickness depends on extraneous factors and is not limited by the process itself. Because the bun 170 will eventually be cut into panels precured reinforced core panels 178, the bun 170 thickness is most often determined by the convenient cutting depth available determines the bun 170 thickness.

In the preferred embodiment, another bun 170 is prepared on top of the previous bun on the same preparation table. A non-bonding paper or layer is placed between two buns 170 creating a bun stock. The height of the bun stock is limited by the available size within the curing press.

After the bun 170 or bun stock is built to its desired height, the bun 170 or bun stock is cured at a requisite temperature and pressure (234). Before curing, the bun 170 or bun stock must be loaded into a curing press. One example of a curing press consists of a lower platen and an upper platen which apply pressure to the surface area of the bun stock. The bun 170 or bun stock must be transferred from the preparation table to the curing press in a manner that prevents disturbance of the positioning of the various layers. For example, the preparation table may be rolled to the curing press and positioned at a height that allows for the bun 170 or bun stock to be easily transferred from the preparation table to the lower platen of the curing press.

The curing press cures the bun 170 or bun stock by applying the requisite pressure and heat (234). After the bun stock is situated within the curing press, the top platen is forced downward on top of the bun stock to apply a desired constant pressure. Specifically, the preferred pressure is between 25 to 40 pounds per square inch, but optimum pressure may depend upon the thickness of the layers used in the buns. After the pressure is applied to the bun 170 or bun stock, the bun 170 or bun stock is placed in a constant ambient temperature. Preferably, ambient temperature is above room temperature. More preferably, the ambient temperature is between approximately 160–180 degrees Fahrenheit. This can be accomplished by moving the curing press inside of a large conventional oven. Once the bun 170 or bun stock is positioned within the oven, it preferably will cure at a constant temperature and under a constant pressure for a specific period of time. The curing time depends on the thickness of the ribs and cores and the size of the overall perimeter of the bun 170 or bun stock. Generally curing time is between 2 and 3 hours.

Subsequently, the bun 170 or bun stock is cooled (238). The curing press is removed from the oven and the bun stock is cooled at either room temperature or cooler for approximately 2 hours. Once the curing press and the bun stock are cooled, the upper platen is moved upward to release the pressure placed on the bun stock. The bun stock is then removed from the curing press in a convenient manner. This may be accomplished by removing the buns 170 individually from the bun stock and positioning them in a convenient location in preparation for the cutting operation.

The bun 170 is cut into strips to provide precured reinforced core panels 178 (242). Preferably, a panel saw with a diamond blade is utilized for the cutting operation. Other methods of cutting the buns into precured reinforced core panels 178 include utilization of a horizontal ban saw using a diamond blade and other similar cutting methods known to those skilled in the art. Specifically, the ends are trimmed and scraped to remove the excess cured phenolic resin and to obtain clean and square edges around the perimeter of the bun 170. Next, the precured reinforced core panels 178 are cut from the bun 170 to a desired thickness depending on the needed floor panel thickness. Finally, a precision sander may be used to create a thickness within a 0.020" tolerance range to generate greater precision in the thickness of the precured reinforced core panels 178. After the precured reinforced core panels 178 are cut and sanded, they are ready to be assembled together and bonded within a floor panel 30.

Generally, the precured reinforced core panels 178 comprise the entire core 50 within the panel 30. More specifically, the precured reinforced core panels 178 must fill the void between the top 54 and bottom skin 58 and within the perimeter defined by the closeouts 42, 46. The assembly process begins on the inner face 70 of the bottom skin 58 that is set in a steel-framed assembly table. First, the lengths of the precured reinforced core panels 178 are cut to match one necessary dimension of the panel 30 in the first direction. Next, the precured reinforced core panels 178 are then laid side by side to fill the second dimension in the other direction. A rib can be created between abutting cores by two methods. First, nothing is placed between the abutting cores allowing for that space to be completely saturated by the liquid phenolic resin. Alternatively, a dry connecting fiberglass fabric strip can be positioned therebetween to be impregnated by the phenolic resin. Because no bonding adhesive is necessary, a uniform impregnation of liquid phenolic resin is possible. The width of the precured reinforced core panels 178 is dependent upon the height of the bun 170, and therefore for larger panels 30, it is more efficient to make the bun 170 height as high as capabilities will allow. Larger bun 170 size will increase the panel assembly rate because a fewer number of precured reinforced core panels 178 will need to be joined. In the preferred embodiment, a rib can be created between the abutting precured reinforced core panels 178, and the closeouts 42, 46 by either method described above regarding abutting cores. Once the entire area has been filled with the precured reinforced core panels 178, and other features present in the core 50 such as mounting blocks 134 or tapping blocks 138, the top skin 54 is applied and the entire panel 30 is cured. After the panel curing process the phenolic panel with the precured reinforced core is ready for any further necessary fabrications.

Various features of the invention are set forth in the following claims.

We claim:

1. A panel comprising:
   a top skin having a thickness;
   a bottom skin having a thickness;
   a core located between the top and bottom skins; and
   closeout contacting the top skin and the bottom skin, wherein the closeout surrounds the core and substantially defines the perimeter of the panel, the closeout being a fiber reinforced material having a thickness that is substantially greater than the thickness of the top skin and the thickness of the bottom skin, wherein the top skin, the bottom skin, and closeout are a phenolic composite.

2. A panel as claimed in claim 1, wherein the core is a precured reinforced core.

3. A panel as claimed in claim 2, wherein the precured reinforced core includes at least one phenolic rib and a plurality of foam strips, the phenolic rib being positioned between two foam strips.

4. A panel as claimed in claim 1, wherein the closeout is machinable to include at least one mating surface.

5. A panel as claimed in claim 4, wherein the mating surface is a lap joint.

6. A panel as claimed in claim 4, wherein the panel defines a plane, the closeout being machinable to include at least one bore through the closeout, the bore being perpendicular to the plane.

7. A panel as claimed in claim 1, wherein the core further includes at least one tapping block, the tapping block including a fiber reinforced material block and a metal plate encapsulated within the block, the tapping block adapted to be drilled and tapped so as to provide the panel with a mounting area with increased support.

8. A panel as claimed in claim 1, wherein the core further includes at least one mounting block, the mounting block including a fiber reinforced material block and being adapted to be drilled so as to provide the panel with a mounting area with increased support.

9. A flooring assembly comprising:
a plurality of panels, said panels being interconnected and each panel of said plurality of panels including
a top skin having a thickness,
a bottom skin having a thickness,
a core located between the top and bottom skins; and
closeout between the top skin and the bottom skin wherein the closeout surrounds the core and substantially defines the perimeter of the panel, the closeout being a fiber reinforced material having a thickness that is substantially greater than the thickness of the top skin and the thickness of the bottom skin, wherein the top skin, the bottom skin, and closeout are a phenolic composite.

10. A flooring assembly as claimed in claim 9, wherein the core is a precured reinforced core.

11. A flooring assembly as claimed in claim 10, wherein the precured reinforced core includes at least one phenolic rib and a plurality of foam strips, the phenolic rib being positioned between two foam strips.

12. A flooring assembly as claimed in claim 9, wherein the closeout is machinable to include at least one mating surface.

13. A flooring assembly as claimed in claim 12, wherein the mating surface is a lap joint.

14. A flooring assembly as claimed in claim 12, wherein the panel defines a plane, the closeout being machinable to include at least one bore through the closeout, the bore being perpendicular to the plane.

15. A flooring assembly as claimed in claim 9, wherein the core further includes at least one tapping block, the tapping block including a fiber reinforced material block and a metal plate encapsulated within the block, the tapping block adapted to be drilled and tapped so as to provide the panel with a mounting area with increased support.

16. A flooring assembly as claimed in claim 9, wherein the core further includes at least one mounting block, the mounting block including a fiber reinforced material block and being adapted to be drilled so as to provide the panel with a mounting area with increased support.

17. A flooring assembly for use in mass transit vehicles, wherein the mass transit vehicle includes a car assembly including spaced apart side walls, spaced apart end walls, and a floor support assembly, said composite flooring assembly comprising:
a plurality of panels interconnected to cover the floor support assembly, and each panel of said plurality of panels including
a top skin having a thickness,
a bottom skin having a thickness,
a core located between the top and bottom skins; and
closeout between the top skin and the bottom skin wherein the closeout surrounds the core and substantially defines the perimeter of the panel, the closeout being a fiber reinforced material having a thickness that is substantially greater than the thickness of the top skin and the thickness of the bottom skin, wherein the core is a precured reinforced core, and wherein the precured reinforced core includes at least one phenolic rib and a plurality of foam strips, the phenolic rib being positioned between two foam strips.

18. A flooring assembly as claimed in claim 17, wherein the closeout is machinable to include at least one mating surface.

19. A flooring assembly as claimed in claim 18, wherein the mating surface is a lap joint.

20. A flooring assembly as claimed in claim 18, wherein the panel defines a plane, the closeout being machinable to include at least one bore through the closeout, the bore being perpendicular to the plane.

21. A flooring assembly as claimed in claim 17, wherein the core further includes at least one tapping block, the tapping block including a fiber reinforced material block and a metal plate encapsulated within the block, the tapping block adapted to be drilled and tapped so as to provide the panel with a mounting area with increased support.

22. A flooring assembly as claimed in claim 17, wherein the core further includes at least one mounting block, the mounting block including a fiber reinforced material block and being adapted to be drilled so as to provide the panel with a mounting area with increased support.

23. A method of manufacturing precured reinforced core, said method comprising the steps of:
providing a foam core to act as a base;
placing at least one layer of fabric on top of the foam core base;
fully impregnating each layer of fabric with phenolic resin;
placing a top layer of foam core on the impregnated fabric to create a bun;
curing the bun at a requisite temperature and pressure; and
cooling the bun thereby creating a finished laminate between the foam layers of the bun such that the laminate does not allow any additional resin to penetrate between the foam layers.

24. A method of manufacturing as claimed in claim 23, further comprising the steps of:
placing at least one intermediate layer of foam core on top of the impregnated fabric;
placing at least one layer of fabric on top of the foam core intermediate; and
impregnating each layer of fabric with phenolic resin.

25. A method of manufacturing as claimed in claims 23, further comprising the steps of:
cutting the bun along a plane perpendicular to the plane of the cores to provide a panel of precured reinforced core.

26. A method of manufacturing as claimed in claim 23, wherein the foam core is a rigid closed-cell foam.

27. A method of manufacturing as claimed in claim 23, wherein the fabric is fiberglass fabric.

28. A method of manufacturing as claimed in claim 27, wherein the fiberglass fabric is bi-axially-oriented.

29. A method of manufacturing as claimed in claim 23, wherein the temperature is constant.

30. A method of manufacturing as claimed in claim 29, wherein the constant temperature is between 160 and 180 degrees Fahrenheit.

31. A method of manufacturing as claimed in claim 23, wherein the pressure is constant.

32. A method of manufacturing as claimed in claim 31, wherein the pressure is between 25 and 40 psi.

33. A panel comprising:
a top skin;
a bottom skin; and
a precured reinforced core made by a method including the steps of providing a foam core to act as a base, placing at least one layer of fabric on top of the foam core base, fully impregnating each layer of fabric with phenolic resin, placing a top layer of foam core on the impregnated fabric to create a bun, curing the bun at a requisite temperature and pressure, and cooling the bun thereby creating a finished laminate between the foam layers of the bun such that the laminate does not allow any additional resin to penetrate between the foam layers.

34. The panel of claim 33, wherein the method of making the precured reinforced core further includes the steps of:

placing at least one intermediate layer of foam core on top of the impregnated fabric;

placing at least one layer of fabric on top of the foam core intermediate; and impregnating each layer of fabric with phenolic resin.

35. The panel of claim 33, wherein the method of making the precured reinforced core further includes the steps of:

cutting the bun along a plane perpendicular to the plane of the cores to provide a panel of precured reinforced core.

36. The panel of claim 33, wherein the foam core is a rigid closed-cell foam.

37. The panel of claim 33, wherein the fabric is fiberglass fabric.

38. The panel of claim 37, wherein the fiberglass fabric is bi-axially-oriented.

39. The panel of claim 33, wherein the temperature is constant.

40. The panel of claim 39, wherein the constant temperature is between 160 and 180 degrees Fahrenheit.

41. The panel of claim 33, wherein the pressure is constant.

42. The panel of claim 41, wherein the pressure is between 25 and 40 psi.

43. A panel comprising:

a top skin;

a bottom skin;

a core located between the top and bottom skins, wherein the core includes at least one tapping block, the tapping block including a fiber reinforced material block and a metal plate encapsulated within the block, wherein the tapping block is adapted to be drilled and tapped so as to provide the panel with a mounting area with increased support.

44. A panel as claimed in claim 1, wherein the top skin and bottom skin are separated by a distance, the thickness of the closeout being greater than the distance between the top skin and bottom skin.

45. A panel as claimed in claim 1, wherein the closeout is made from a material that is capable of passing flame and smoke tests for the mass transit industry.

46. A panel as claimed in claim 1, wherein the closeout is made from a water resilient material.

47. A panel comprising:

a top skin having a thickness;

a bottom skin having a thickness;

a core located between the top and bottom skins; and closeout contacting the top skin and the bottom skin, wherein the closeout surrounds the core and substantially defines the perimeter of the panel, the closeout being a fiber reinforced material having a thickness that is substantially greater than the thickness of the top skin and the thickness of the bottom skin, wherein the core is a precured reinforced core, and wherein the precured reinforced core includes at least one phenolic rib and a plurality of foam strips, the phenolic rib being positioned between two foam strips.

48. A panel comprising:

a top skin having a thickness;

a bottom skin having a thickness;

a core located between the top and bottom skins; and closeout contacting the top skin and the bottom skin, wherein the closeout surrounds the core and substantially defines the perimeter of the panel, the closeout being a fiber reinforced material having a thickness that is substantially greater than the thickness of the top skin and the thickness of the bottom skin, wherein the core further includes at least one mounting block, the mounting block including a fiber reinforced material block and being adapted to be drilled so as to provide the panel with a mounting area with increased support.

49. A flooring assembly comprising:

a plurality of panels, said panels being interconnected and each panel of said plurality of panels including a top skin having a thickness, a bottom skin having a thickness, a core located between the top and bottom skins; and closeout between the top skin and the bottom skin wherein the closeout surrounds the core and substantially defines the perimeter of the panel, the closeout being a fiber reinforced material having a thickness that is substantially greater than the thickness of the top skin and the thickness of the bottom skin, wherein the core is a precured reinforced core, and wherein the precured reinforced core includes at least one phenolic rib and a plurality of foam strips, the phenolic rib being positioned between two foam strips.

50. A flooring assembly comprising:

a plurality of panels, said panels being interconnected and each panel of said plurality of panels including a top skin having a thickness, a bottom skin having a thickness, a core located between the top and bottom skins; and closeout between the top skin and the bottom skin wherein the closeout surrounds the core and substantially defines the perimeter of the panel, the closeout being a fiber reinforced material having a thickness that is substantially greater than the thickness of the top skin and the thickness of the bottom skin, wherein the core further includes at least one mounting block, the mounting block including a fiber reinforced material block and being adapted to be drilled so as to provide the panel with a mounting area with increased support.

51. A flooring assembly for use in mass transit vehicles, wherein the mass transit vehicle includes a car assembly including spaced apart side walls, spaced apart end walls, and a floor support assembly, said composite flooring assembly comprising:

a plurality of panels interconnected to cover the floor support assembly, and each panel of said plurality of panels including a top skin having a thickness, a bottom skin having a thickness, a core located between the top and bottom skins; and closeout between the top skin and the bottom skin wherein the closeout surrounds the core and substantially defines the perimeter of the panel, the closeout being a fiber reinforced material having a thickness that is substantially greater than the thickness of the top skin and the thickness of the bottom skin, wherein the core further includes at least one mounting block, the mounting block including a fiber reinforced material block and being adapted to be drilled so as to provide the panel with a mounting area with increased support.

* * * * *